United States Patent [19]
Laberge

[11] Patent Number: 5,882,588
[45] Date of Patent: Mar. 16, 1999

[54] PROCESS FOR DISINFECTING HOT WATER SUPPLY SYSTEMS

[75] Inventor: Fabrice Laberge, Liebefeld-Berne, Switzerland

[73] Assignee: Carbagas, Liebefeld-Berne, Switzerland

[21] Appl. No.: 491,908

[22] PCT Filed: Nov. 9, 1994

[86] PCT No.: PCT/US94/03751

§ 371 Date: Jul. 18, 1995

§ 102(e) Date: Jul. 18, 1995

[87] PCT Pub. No.: WO95/13989

PCT Pub. Date: May 26, 1995

[30] Foreign Application Priority Data

Nov. 19, 1993 [CH] Switzerland .............................. 3460/93

[51] Int. Cl.⁶ ....................................................... C02F 1/78
[52] U.S. Cl. ........................... 422/28; 422/41; 422/905; 261/DIG. 42; 210/760; 210/764
[58] Field of Search ................................. 422/28, 41, 106, 422/905, 186.12; 261/DIG. 42, 122.1, 18.1, DIG. 75; 210/743, 744, 760, 764, 96.1, 104, 109, 137, 218, 220, 221.2

[56] References Cited

U.S. PATENT DOCUMENTS

| | | | |
|---|---|---|---|
| 2,660,559 | 11/1953 | Prime | 210/760 |
| 3,448,045 | 6/1969 | Hess et al. | 210/760 |
| 4,156,652 | 5/1979 | Wiest | 250/527 |
| 4,309,388 | 1/1982 | Tenney et al. | 422/304 |
| 4,409,183 | 10/1983 | Fischer | 422/62 X |
| 5,004,587 | 4/1991 | Tacchi | 422/186.19 |
| 5,087,419 | 2/1992 | Lutz | 422/28 |
| 5,120,512 | 6/1992 | Masuda | 422/297 |
| 5,145,585 | 9/1992 | Coke | 261/DIG. 42 X |
| 5,190,648 | 3/1993 | Ramsauer | 261/DIG. 42 X |
| 5,527,508 | 6/1996 | Childers et al. | 422/33 |

FOREIGN PATENT DOCUMENTS

| | | | |
|---|---|---|---|
| 0372293 | 6/1990 | European Pat. Off. | |
| 0442254 | 8/1991 | European Pat. Off. | |
| 0761237 | 12/1997 | European Pat. Off. | A61L 2/20 |
| 2695828-A1 | 3/1994 | France | A61L 11/00 |
| 2059859 | 7/1971 | Germany . | |
| 3813793 C1 | 4/1989 | Germany | A61L 2/20 |
| 05115540 A | 5/1993 | Japan | A61L 11/00 |
| 06327748 A | 11/1994 | Japan | A61L 2/20 |
| 07136236 A | 5/1995 | Japan | A61L 2/20 |
| 86/05100 | 9/1986 | WIPO | A61L 2/20 |
| 94/06483 | 3/1994 | WIPO | A61L 11/00 |

*Primary Examiner*—Krisanne Thornton
*Assistant Examiner*—E. Leigh McKane
*Attorney, Agent, or Firm*—Limbach & Limbach L.L.P.

[57] ABSTRACT

In the process for the ozone treatment of hot water in the hot water supply system of a building for the purpose of disinfection of the water, the hot water is led into a treatment tank (3). Here the pressure is reduced to a level below that in the pipes of the hot water supply system, an ozone-containing gas being continually introduced into the water, which gas passes through the water in the form of bubbles, the ozone being given up to the water. The remaining gas subsequently undergoes transition to a gaseous state in the upper part of the tank, from which the gas is drawn off. The treated water is then fed into the hot water supply system of the building, the pressure being restored by means of at least one pump to the level of the operating pressure within the hot water supply system. The method can be used to remove harmful micro-organisms such as legionella pneumophila from hot water systems without raising the temperature to around 70° C.

18 Claims, 1 Drawing Sheet

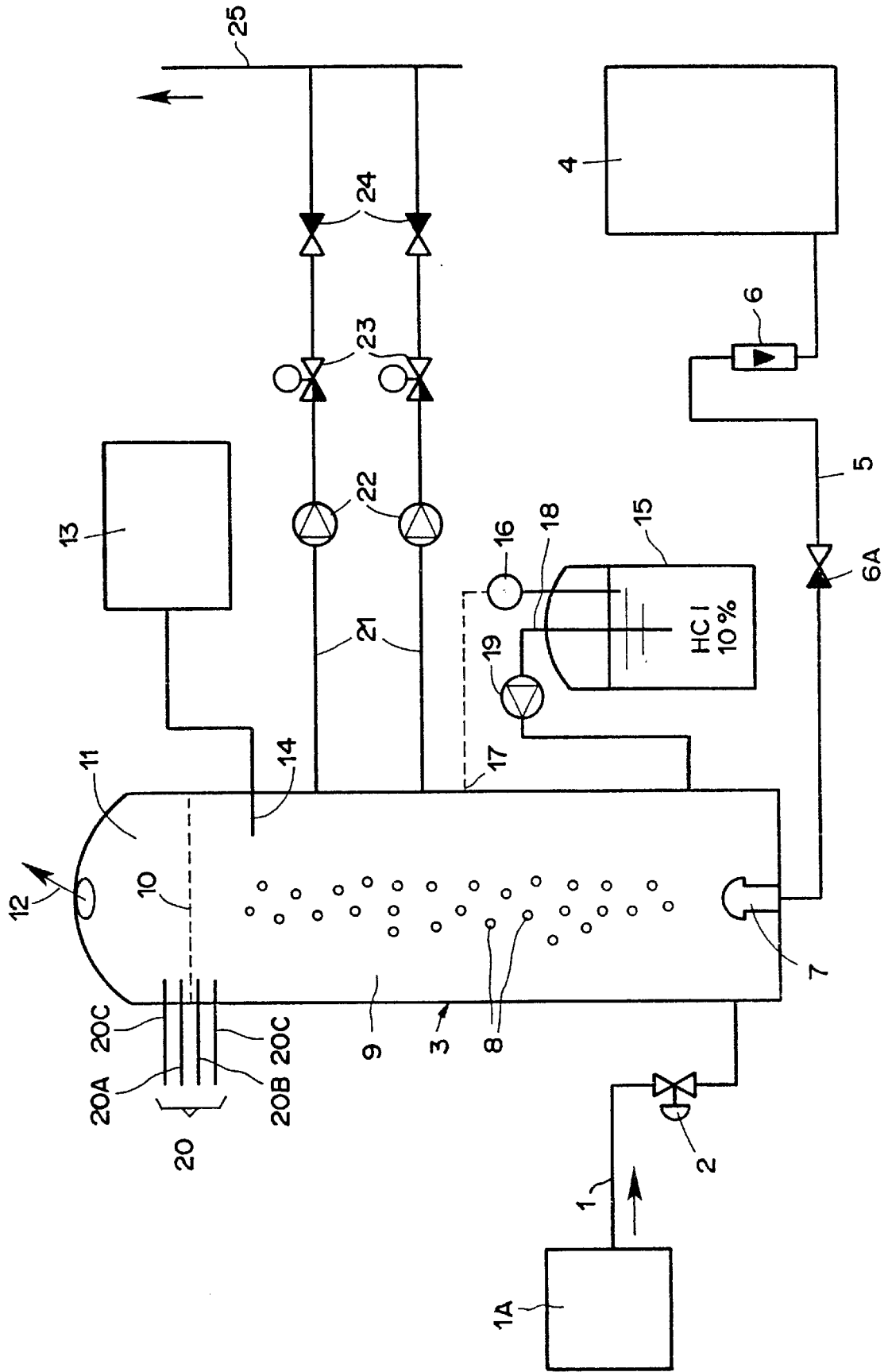

PROCESS FOR DISINFECTING HOT WATER SUPPLY SYSTEMS

BACKGROUND OF THE INVENTION

1. Field of the Invention

The subject matter of the present invention is a process for disinfecting hot tap water in hot water supply systems of buildings. The process serves in particular to kill heat-stable bacteria which develop in water at temperatures between 40° and 60° C. The process is especially useful for disinfection of hot water pipes in hospitals.

2. Related Art

Since the first appearance of the so-called legionnaires' disease in 1976, it is known that the pathogen which causes this disease, legionella pneumophila, is not uncommon and is very widespread in nature. It has been shown that temperatures of up to 45° C. are favorable for the development of this pathogen. Since temperatures of around 50° C. in hot water supply systems do not suffice to kill these microorganisms, water in hot water supply systems is heated, as a rule, to higher temperatures. This fact entails energy costs for hospitals which are not insignificant, and moreover promotes deposits in piping.

The internally transmissible legionnaire's pneumonia has become a serious problem in hospitals. While legionella are unable to cause illness in most healthy human beings, they lead to the outbreak of disease in the sick and the infirm. Since this problem is well known, various methods have been proposed to kill these bacteria in the hot water distribution systems in hospitals. Proposed as methods have been hyperchlorination, thermal treatment, ozonization, UV treatment and the addition of metal ions such as copper and silver ions. The simplest method so far has been thermal treatment of the water. This has the disadvantage, however, that energy costs for water conditioning are higher and that water comes out of the taps at very high temperatures. Hyperchlorination has the main disadvantage that the pipes are thereby corroded and that carcinogenic by-products may be produced. With UV treatment, problems arise if calcareous deposits are formed on the UV source, diminishing the efficiency of the treatment. Contact with water can also damage the lamps. In the case of treatment with metal ions, the main disadvantage is that the water has to be mixed with chemical substances which then remain in the water. This can lead to undesired reactions in the user and to the accumulation of heavy metal ions in waste water.

Ozone treatment has the advantage that only a short contact with the bacteria or the virus is necessary in order to kill it. It can be learned from scientific literature that a dose of 1 to 2 mg/liter of ozone is expedient for the treatment of tap water. Since ozone decomposes relatively quickly, and since, on the other hand, ozone has undesirable characteristics when in high concentrations, it is necessary that the dose of ozone be adapted precisely to the water distribution system. On the one hand, the ozone concentration must lie below that which could have a harmful effect on the water user. On the other hand, the ozone concentration must be sufficient to kill the harmful organisms in the water. Owing to the characteristics of ozone, its use for the disinfection of hot water supply systems until now has entailed problems which have limited its application.

SUMMARY OF THE INVENTION

It is thus the object of the present invention to make available a process which permits the uninterrupted disinfection of hot water supply systems in buildings through ozone treatment and makes possible precise dosage and exact control of the ozone concentration, the user being in no way exposed to the effects of the ozone.

It has been found that these requirements are fulfilled with the process according to the invention.

The subject matter of the present invention is thus a process of ozone treatment of hot water for the purpose of disinfection of the water in a hot water supply system of a building, which system comprises a feeding pipe, a heat transfer means, an ozone treatment device and a distribution system which leads to the users, wherein the warm water is led from the heat transfer means, under a reduction of pressure, into a treatment tank having the ozone treatment device so that the pressure in the treatment tank is less than the operating pressure of the hot water supply system, an ozone-containing gas is fed continuously into the water in the treatment vessel, this ozone-containing gas passes through the water in the form of bubbles, ozone being given up to the water, and the gas undergoing transition into a gas phase in the upper section of the tank, from which the gas is drawn off, and the treated water is then conducted, under an increase in pressure up to the operating pressure of the warm water supply system, to the distribution system of the building.

The subject matter of the invention is also an apparatus for ozone treatment of hot water for the purpose of disinfection of the water in a hot water supply system of a building characterized by a feeding pipe, a heat transfer means for heating the water, a treatment tank with a feeding pipe with a reducing valve for decreasing the higher operational pressure of the supply system to the lower pressure of the treatment tank, a device for generation of an ozone-containing gas with a feeding pipe to the treatment tank, and a gas take-off for the remaining gas coming out of the water, at least one drain for the treated water from the treatment tank to the user, a pump, which is disposed at the drain, and which serves to increase the pressure of the treated water to the higher operational pressure of the water supply system.

BRIEF DESCRIPTION OF THE DRAWING

The FIGURE illustrates a diagrammatic view of a device for carrying out the process in accordance with the present invention.

DESCRIPTION OF PREFERRED EMBODIMENT

In the process according to the present invention, the water which is conducted from a water supply into the piping of a building is first led through a heat exchange system into a treatment tank where ozone treatment takes place through passage of an ozone-containing gas. The pressure in this treatment tank is less than the pressure in the supply system. This can be achieved by leading the water through a reducing valve, from which the pressure of the pipes is reduced. The ozone-containing gas is led into the treatment tank, the gas being collected after the treatment in the upper section of the tank above the surface of the water and drawn off. The treated water is then brought back to the pressure required in the supply system by means of a pump.

The ozone being fed in is preferably generated continuously by an ozonizer wherein oxygen or another gas containing oxygen is introduced and an electrical charge takes place. The generation of ozone is thereby controlled by a device for ozone analysis which determines the ozone content of the treated water by means of a probe. The treatment device, which has preferably the shape of a column, has a level regulating system which determines the position of the water level and regulates the water supply correspondingly. This can take place, for example, by means of a system with a float or by means of upper and lower probes. If the water level moves outside the range set by the regulation system, preferably a further regulation system, which can operate with probes, ensures emergency shutdown of the system.

The treatment system can additionally comprise a device for adjustment of the pH. A pH probe determines thereby the pH. With this probe, a neutralization system is controlled which adjusts the pH to the desired neutral value. The gas coming out of the treatment device above is led into the building's exhaust system, any ozone which may have been present being destroyed beforehand, for example by means of a catalytic converter. The feeding of ozone into the lower part of the vessel takes place, as a rule, through ceramic frit or an analogous distribution means. Thus the ozone-containing gas, which preferably has an oxygen content of between 2 and 10% $O_3$, passes through the water in the form of bubbles.

The treatment system is preferably controlled electronically, the ozone supply, the pH and the water supply being controlled depending upon the water use, the measured ozone content in the treated water and the pH of the water introduced. The treated water preferably has a temperature of 50° C. This is an ideal temperature for water supply systems, since, on the one hand, considerable amounts of energy can be saved thereby, and, on the other hand, the temperature of the water coming out of the taps is not too high, so skin burns can be practically excluded.

To facilitate an uninterrupted ozone treatment, the system can have more than one, for example two, separately connectible ozone generation devices. In this way one of these devices can be revised or repaired without the system having to be shut down. The treatment vessel can likewise be provided with two or more drains with pumps so that operation can be maintained even when work is being done on the pumps. For this purpose the pumps must be separable from the water supply system through corresponding valves. If a large amount of water is required, two pump systems, or even more, could be installed in parallel to prevent, if necessary, a drop in pressure in the water supply.

The system permits an effective killing of microorganisms such as, in particular, legionella pneumophila, in hot water supply systems of buildings, especially hospitals. Once the water supply system is free of harmful organisms, the uninterrupted supply of ozone-treated water must be guaranteed since otherwise once again there can be contamination from the water led in or contamination from the water taps. Consequently, for an efficient hot water treatment, at least two ozone treatment apparatuses are preferably disposed in one water system, when one apparatus is malfunctioning or being serviced, the other being able to take over the task of ozonization of the water system. As a rule, a water supply system for a building has a pressure of $5 \times 10^5$ Pa (5 bar). In the installed treatment system according to the invention, the operational pressure is preferably $0.5 \times 10^5$ Pa (0.5 bar). The pressures of the hot water supply system can be varied within the normal range. The pressure in the treatment tank can likewise be varied within technically sensible values.

The present invention will be explained more closely with reference to the accompanying drawing. The single FIGURE is a diagrammatic view of a device for carrying out the process according to the invention.

With reference to this FIGURE, one embodiment of the process according to the invention will be explained more closely. Through supply line 1, water is led via a heat exchanger 1A, where it is heated to a temperature of approx. 50° C., and, through a reducing valve 2, is introduced below into the column-shaped treatment tank.

The treatment vessel is filled approx. 80% to water level line 10. The oxygen gas used for the ozone treatment is led from an oxygen storage vessel into the ozonization apparatus 4. Here an electric discharge takes place in oxygen, the oxygen being enriched with ozone up to about 10%. The ozone-containing gas is led through the water system 5 through the flow regulator valve 6 and the back pressure valve 6A to the distribution means 7, located in the bottom of the treatment vessel. The distribution means 7 is preferably an inert ceramic frit. From there bubbles 8 of the ozone-containing oxygen form throughout the water in the column, $O_3$ passing into the water and the remaining gas entering at water level 10 into the gas chamber 11 of the column and being conducted via the drain to the exhaust system of the building. The let off ozone-containing gas is conducted past a catalytic converter, if necessary, in order to destroy any remaining ozone. The device for ozone analysis 13 serves to control the supply of the ozone-containing gas, which device controls the ozone content of the treated water 9 via a probe 14 and which controls the ozone generating device 4. This apparatus ensures that the ozone values of the treatment water lie within the desired range. The pH of the water is also adjusted in the ozone treatment tank, if necessary. In the present case, water having a pH of approximately 8.2, when introduced, is neutralized to pH 7.2. This takes place through the hydrochloric solution which is located in the storage vessel 15, which is connected to the treatment vessel 3 via a piping 18 with a pump 19. By means of the pH probe 17, the pH of the treated water in the vessel is determined, the pH-meter 16 controlling the switching on and off of pump 19. So that the water level 10 can be kept at the desired place in the treatment column 3, probes 20 for adjustment of the level are disposed at the corresponding place in the column. Probe 20A reports to the control system that the water level 10 has reached the upper limit and causes a reduction of the water supply. Probe 20B reports to the control unit (not shown) of the system that the water level has reached the minimum mark and causes an increase in water supply. The two probes 20C are alarm probes which report to the control system that the water level lies outside the normal levels and thus cause a shutting off of the system with an alarm. The treated water is led through the pipeline 21 via the compression pump 22 into the water system 25 for supply of the building. The piping 21 has the usual control valves or return valves, 23 or 24, respectively. By means of the pumps 22, the hydrostatic pressure is raised from $0.5 \times 10^5$ Pa (0.5 bar) back to the $5 \times 10^5$ Pa (5 bar) of the water system.

I claim:

1. A method for the ozone treatment of hot water, for the purpose of disinfection of the water, of a hot water supply system of a building, which system comprises a feeding pipe which supplies hot water from a heat transfer means to an ozone treatment device, and a distribution system which leads to users, wherein the method comprises the steps of:

feeding hot water from the heat transfer means, under a reduction of pressure, into a treatment tank having the ozone treatment device;

lowering the pressure in the treatment tank to less than an operating pressure of the hot water supply systems;

introducing an ozone-containing gas continuously into the water in the treatment tank, wherein this ozone-containing gas passes through the water in the form of bubbles;

dissolving ozone in the water, and the gas undergoing transition into a gas phase in an upper section of the tank;

drawing off the gas from the tank; and conducting the treated water, under an increase of pressure to the operating pressure of the hot water supply system, to the distribution system of the building.

2. The method according to claim 1, wherein the treatment tank has the shape of a column.

3. The method according to claim 1 or 2, wherein the pH is adjusted by means of an automatic neutralization system controlled by a probe by introducing an acid or a base into the water.

4. The method according to claim 1, wherein the ozone-containing gas is oxygen, which is continuously treated using an ozonizer for the generation of ozone by means of electrical discharge and the ozone-containing gas obtained is led over ceramic frit below in the treatment tank.

5. The method according to claim 4 wherein the ozone content is measured by a probe by means of a device for ozone analysis and the ozone supply controlled corresponding to the measured value.

6. The method according to claim 1, wherein the water level in the treatment tank is kept essentially constant by means of a level regulating system, the water supply being controlled by an upper and a lower measuring probe.

7. The method according to claim 6, wherein the measuring system has further probes for level adjustment, which probes cause emergency shutdown of the system as soon as the water level is outside the desired range.

8. The method according to claim 1, wherein the pressure in the hot water supply system is in the range of $3 \times 10^5$ Pa to $7 \times 10^5$ Pa.

9. The method according to claim 8, wherein the pressure in the hot water supply system is $5 \times 10^5$ Pa.

10. The method according to claim 1, wherein the pressure in the treatment tank is in the range of $3 \times 10^4$ to $7 \times 10^4$ Pa.

11. The method according to claim 9, wherein the pressure in the treatment tank is $5 \times 10^4$ Pa.

12. The method according to claim 1, wherein the heat transfer means is a boiler system, a flow heater or a heat exchanger.

13. Apparatus for ozone treatment of hot water for the purpose of disinfection of the water in a hot water supply system of a building, comprising:

a heat transfer means for heating the water;

a treatment tank for forming treated water;

a feeding pile supplying hot water from the heat transfer means to the treatment tank, the feeding pipe having a reducing valve to decrease a higher operational pressure of the supply system to a lower pressure of the treatment tank;

a device for generation of an ozone-containing gas with a second feeding pipe to the treatment tank; and a gas take off for the remaining gas coming out thereof;

at least one drain for supplying the treated water from the treatment tank to an end user; and a pump, which is disposed at the drain, and which serves to increase the pressure of the treated water to the higher operational pressure of the water supply system.

14. Apparatus according to claim 13 wherein it has additionally at least one of the following features:

a level regulating device, which keeps water level in the treatment tank at a predetermined level, a device for ozone analysis which determines an ozone content of the water by means of a probe, and a control device, which controls the supply of water and ozone-containing gas on the basis of the predetermined level and the ozone content of the water.

15. Apparatus according to claim 13 or 14, wherein there is additionally a means for adjusting the pH.

16. A method for the ozone treatment of hot water, for the purpose of disinfection of the water, of a hot water supply system of a building, which system comprises a feeding pipe which supplies hot water from a heat transfer means to an ozone treatment device, and a distribution system which leads to users, wherein the method comprises the steps of:

heating water to approximately 50 degrees Celsius;

feeding the hot water from the heat transfer means, under a reduction of pressure, into a treatment tank having the ozone treatment device;

lowering the pressure in the treatment tank to a range of $3 \times 10^4$ to $7 \times 10^4$ Pa, wherein the pressure is less than an operating pressure of the hot water supply system;

introducing an ozone-containing gas continuously into the water in the treatment tank, wherein this ozone-containing gas passes through the water in the form of bubbles;

dissolving ozone in the water, and the gas undergoing transition into a gas phase in an upper section of the tank;

drawing off the gas from the tank; and conducting the treated water, under an increase of pressure to the operating pressure of the hot water supply system, to the distribution system of the building, wherein the operating pressure of the hot water supply system is in the range of $3 \times 10^5$ Pa to $7 \times 10^5$ Pa.

17. The method according to claim 14, wherein thepressure in the treatment tank is $5 \times 10^4$ Pa.

18. The method according to claim 14, wherein the pressure in the hot water supply system is $5 \times 10^5$ Pa.

* * * * *